(12) United States Patent
Matheny

(10) Patent No.: US 7,938,369 B2
(45) Date of Patent: May 10, 2011

(54) METHOD AND APPARATUS FOR AERIAL FUEL TRANSFER

(75) Inventor: William Francis Matheny, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 672 days.

(21) Appl. No.: 12/017,661

(22) Filed: Jan. 22, 2008

(65) Prior Publication Data

US 2009/0184205 A1    Jul. 23, 2009

(51) Int. Cl.
*B64D 39/00*    (2006.01)
(52) U.S. Cl. .................................... 244/135 A
(58) Field of Classification Search ............ 244/1 TD, 244/3, 135 A; 141/1, 279, 387
See application file for complete search history.

(56) References Cited

U.S. PATENT DOCUMENTS

| | | | | |
|---|---|---|---|---|
| 2,960,295 A | * | 11/1960 | Schulze | 244/135 A |
| 3,011,737 A | * | 12/1961 | Morrow | 244/3 |
| 3,285,544 A | * | 11/1966 | Chope et al. | 244/135 A |
| 5,131,438 A | * | 7/1992 | Loucks | 244/135 A |
| 7,219,857 B2 | | 5/2007 | Takacs et al. | |

* cited by examiner

*Primary Examiner* — Galen Barefoot
(74) *Attorney, Agent, or Firm* — Yee & Associates, P.C.; Euclid Wood

(57) ABSTRACT

A method and apparatus for transferring fuel onto or off of an aircraft. A refueling transfer duct is deployed from an aft station of the aircraft being serviced while the aircraft is flying, wherein the transfer apparatus comprises a hose with a controllable drogue attached to its free end. The refueling duct is positioned through control signals sent by a tanker aircraft to the controllable drogue to form a favorably positioned refueling duct capable of a finite final docking maneuver. The positioned refueling duct is connected to the tanker aircraft positioned behind the aircraft to form a connection. The fuel is transferred through the connection to a fuel tank or fuel storage system located within the aircraft.

15 Claims, 4 Drawing Sheets

METHOD AND APPARATUS FOR AERIAL FUEL TRANSFER

BACKGROUND INFORMATION

1. Field

The present disclosure relates generally to aircraft and in particular to refueling aircraft. Still more particularly, the present disclosure relates to a method and apparatus for moving fuel between two aircraft during flight.

2. Background

Air refueling is a process of transferring fuel from one aircraft to another aircraft during flight. A tanker aircraft is the aircraft that typically provides fuel to another aircraft. The aircraft receiving fuel is referred to as a refueling aircraft. This process allows the aircraft receiving fuel to remain in flight for longer periods of time. As a result, an aircraft may extend its range through this type of process. A series of air refuelings may provide a range that is limited only by crew fatigue and maintenance factors, such as engine oil consumption.

Further, when an aircraft can receive extra fuel in the air, the aircraft can takeoff with a greater payload, such as weapons, cargo, or personnel. In this manner, the maximum takeoff weight may be maintained by balancing the larger payload with less fuel.

A tanker aircraft is especially designed for transferring fuel to an aircraft during flight. Various mechanisms may be used to provide the refueling. These mechanisms include, for example, a boom and receptacle system, and a probe and drogue system. With a boom and probe system, a long rigid hollow shaft may be attached to the rear of the tanker aircraft. This attachment is flexible allowing the boom to move with respect to the tanker aircraft. At the end of this tube is a nozzle attached on the flexible ball joint. The nozzle mates to a receptacle that is mounted on the aircraft that is to receive the fuel.

The refueling aircraft flies in formation directly below and behind the boom. When cleared, the aircraft moves forward into a contact position. This positioning may be aided either with voice commands or visual commands from a crew member operating the boom. Once the aircraft receiving the fuel reaches the contact position, the pilot attempts to hold the refueling aircraft in place with little relative motion with respect to the tanker aircraft. When refueling is complete, the pilot of the refueling aircraft may then disengage the receptacle from the boom.

Another system used in refueling is a probe and drogue system. This type of system involves the use of a drogue attached to a flexible hose that extends from the tanker aircraft or boom attached to the tanker aircraft. A drogue is a funnel shaped or cone shaped refueling duct that is towed behind an aircraft. The drogue may function as a target for the probe to create a connection between the tanker aircraft and the aircraft receiving fuel. Further, the drogue itself may include a connector to facilitate the connection between the tanker aircraft and the refueling aircraft.

With a probe and drogue system, the tanker aircraft flies at a straight and level route. The drogue attached to the hose trails behind and below the tanker aircraft. The pilot of the refueling aircraft has a probe attached to the refueling aircraft and flies the aircraft to place the probe directly into the drogue.

This type of system typically requires a closure rate of at least two knots to provide a soft contact to lock valves in the probe and drogue together for refueling. If the speed is too high, damage may occur to the probe or drogue.

If an approach by a pilot of a receiving aircraft to the drogue of a tanker aircraft does not occur at a desired angle and speed, damage to one or more components, such as a probe or valves in the drogue, may occur. Further, if the valves are not properly locked in the drogue and the probe, fuel may spill out.

These types of refueling processes are commonly used for refueling military aircraft. No such fueling has been performed on any regular basis for commercial aircraft. This type of refueling requires training of the pilots flying the aircraft to receive the fuel. As can be seen, from these two currently used systems, pilots flying aircraft receiving the fuel perform a number of different steps for the refueling process, are skilled in flying the aircraft in a manner to engage the drogue or boom, and to maintain a tightly controlled position during the refueling process.

SUMMARY

The advantageous embodiments provide a method and apparatus for refueling an aircraft. In one advantageous embodiment, a refueling duct is deployed from an aft position of the aircraft while the aircraft is flying, wherein the refueling duct comprises a hose and a controllable drogue. The refueling duct is positioned through control signals sent by a tanker aircraft to the controllable drogue to form a positioned refueling duct. The positioned refueling duct is connected to the tanker aircraft positioned behind and above the aircraft to form a connection. The fuel is transferred through the connection to a fuel storage system located within the aircraft.

In another advantageous embodiment, a method is provided for refueling an aircraft. A tanker aircraft is positioned behind the aircraft while the aircraft is in flight, wherein the aircraft has a refueling duct deployed from an aft position. The refueling duct is connected to the tanker aircraft positioned behind the aircraft to form a connection and fuel is transferred through the connection.

In yet another advantageous embodiment, an apparatus comprises an aircraft and refueling duct located at an aft position of the aircraft and capable of being deployed behind the aircraft and capable of receiving fuel while the aircraft is in flight.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
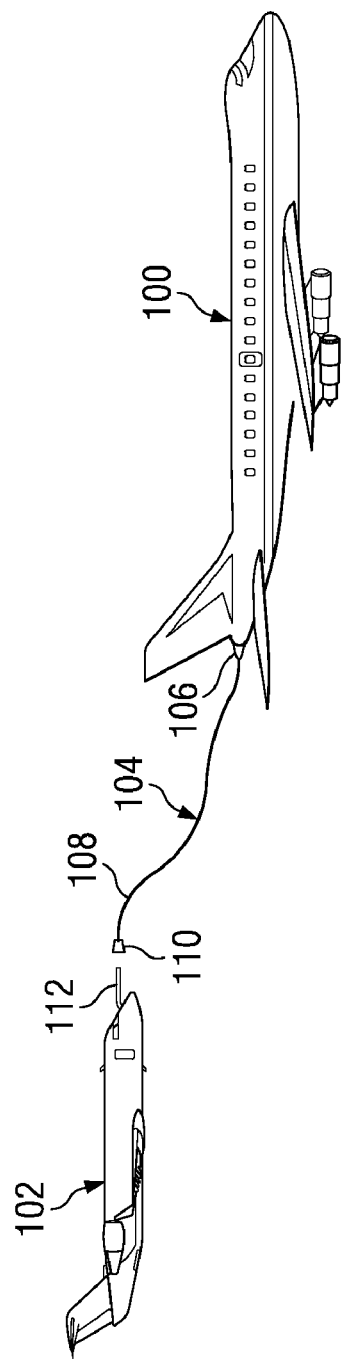
FIG. 1 is a diagram illustrating two aircraft used in a refueling process in accordance with an advantageous embodiment.

With reference now to the figures and in particular with reference to FIG. 1, a diagram illustrating two aircraft used in a refueling process is depicted in accordance with an advantageous embodiment. In this example, aircraft 100 is a refueling aircraft that is to receive fuel. Tanker aircraft 102 is a source of fuel for aircraft 100.

In this example, aircraft 100 has refueling duct 104, which trails from aft position 106 of aircraft 100. Refueling duct 104 takes the form of hose 108 and drogue 110. Tanker aircraft 102 includes probe 112. This probe also may be referred to as a stinger and is capable of coupling with drogue 110. In this example, tanker aircraft 102 is located behind aircraft 100 for the refueling process. Tanker aircraft 102 is located above aircraft 100 as well as being behind aircraft 100. By being located above aircraft 100, pumping or transferring fuel from tanker aircraft 102 to aircraft 100 is achieved using less horsepower in the pumping equipment due to utilizing gravity assistance in the transfer of fuel with this type of positioning.

The different advantageous embodiments recognize that extensive training and practice is needed to successfully perform refueling of aircraft during flight. In particular, the different advantageous embodiments recognize that the pilot of the aircraft engaging refueling duct 104 requires more training and skill than the pilot of the aircraft from which refueling duct 104 is located. Currently used refueling configurations require the pilot of the aircraft receiving fuel to position the aircraft and engage refueling duct 104.

Further, the different advantageous embodiments recognize that although it would be advantageous to refuel commercial aircraft during flight, the training and process is also made more difficult because commercial aircraft are harder to maneuver than many military aircraft. In this manner, commercial aircraft may have increased ranges without requiring landing and taking off. By avoiding additional landing and takeoffs of an aircraft, fuel usage also may be conserved.

Thus, the different advantageous embodiments position tanker aircraft 102 with respect to aircraft 100, rather than using the common practice of having the refueling aircraft position itself with a tanker aircraft. In this manner, the number of pilots that need to be trained to perform aerial refueling is reduced.

With the different advantageous embodiments, only pilots of tanker aircraft 102 need to have the skills and training to perform aerial refueling. The more numerous numbers of pilots for aircraft 100 do not require any extensive training. Instead, the pilots and/or crew of aircraft 100 may only need to deploy and retrieve refueling duct 104. In some cases and in consideration of various design configurations, the deployment and retrieval of refueling duct 104 may be initiated by tanker aircraft 102.

Figure 2:
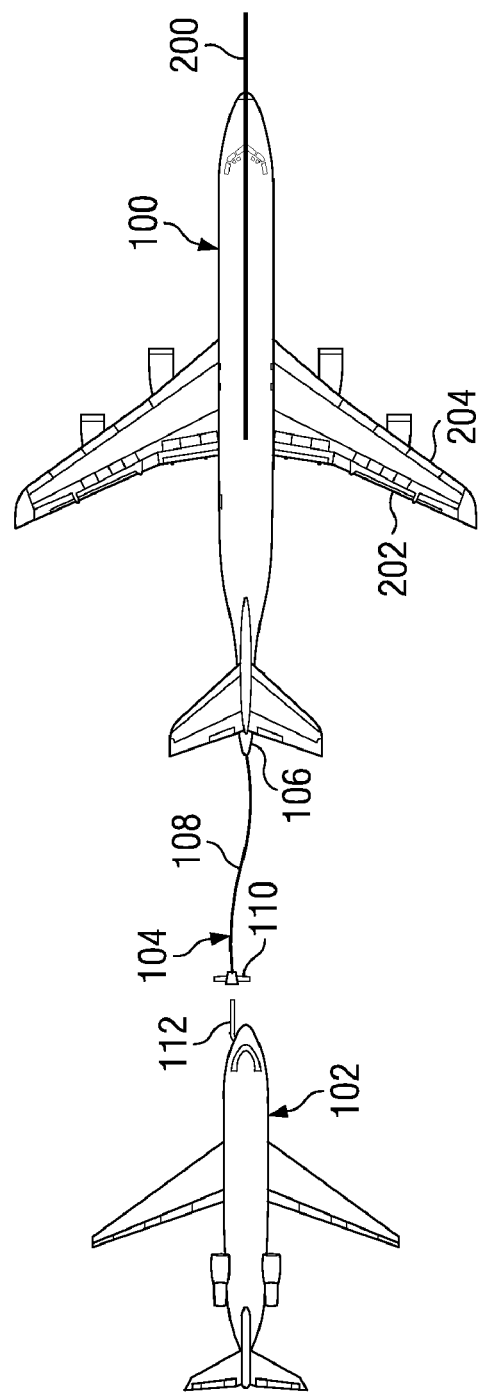
FIG. 2 is a top view of an aircraft and a tanker aircraft in accordance with an advantageous embodiment.

With reference next to FIG. 2, a top view of an aircraft and a tanker aircraft is depicted in accordance with an advantageous embodiment. In this example, a top view of aircraft 100 and tanker aircraft 102 from FIG. 1 is depicted. As can be seen, tanker aircraft 102 is directly behind aircraft 100.

Tanker aircraft 102 is substantially along axis 200. Axis 200 is substantially central with respect to aircraft 100, in this example. Of course, in other advantageous embodiments, tanker aircraft 102 may be located off axis 200 or even substantially off axis 200 from aircraft 100. This type of positioning may occur through moving or positioning drogue 110 off axis 200. Of course, in other advantageous embodiments, refueling duct 104 may be located in another position. For example, refueling duct 104 may be located on aft side 202 of wing 204 of aircraft 100.

Figure 3:
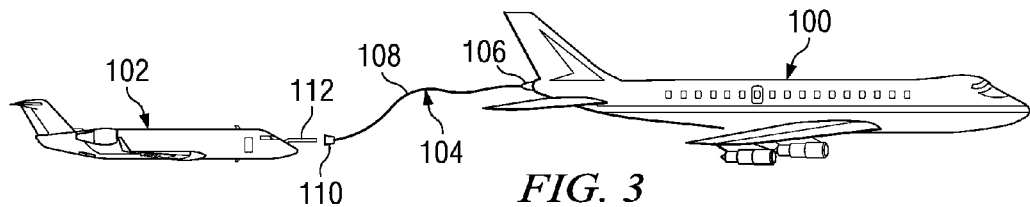
FIG. 3 is a diagram illustrating a side view of an aircraft and a tanker aircraft in accordance with an advantageous embodiment.

Turning now to FIG. 3, a diagram illustrating a side view of an aircraft and a tanker aircraft is depicted in accordance with an advantageous embodiment. In this example, tanker aircraft 102 is located below aircraft 100. This type of positioning may be used for a reverse transfer of fuel from aircraft 100 to tanker aircraft 102.

This type of reverse transfer of fuel may be performed if aircraft 100 has too much fuel, resulting in having more weight than desired. Typically, aircraft 100 would dump or release the extra fuel. By returning the extra fuel to tanker aircraft 102, the cost of fuel lost from dumping fuel is avoided. Additionally, environmental issues are avoided by use of this recovery method. Of course, refueling of aircraft 100 also may be performed from this positioning or from that of positioning on aft side 202, depending on the type of fuel transfer system present in tanker aircraft 102 and aircraft 100.

Figure 4:
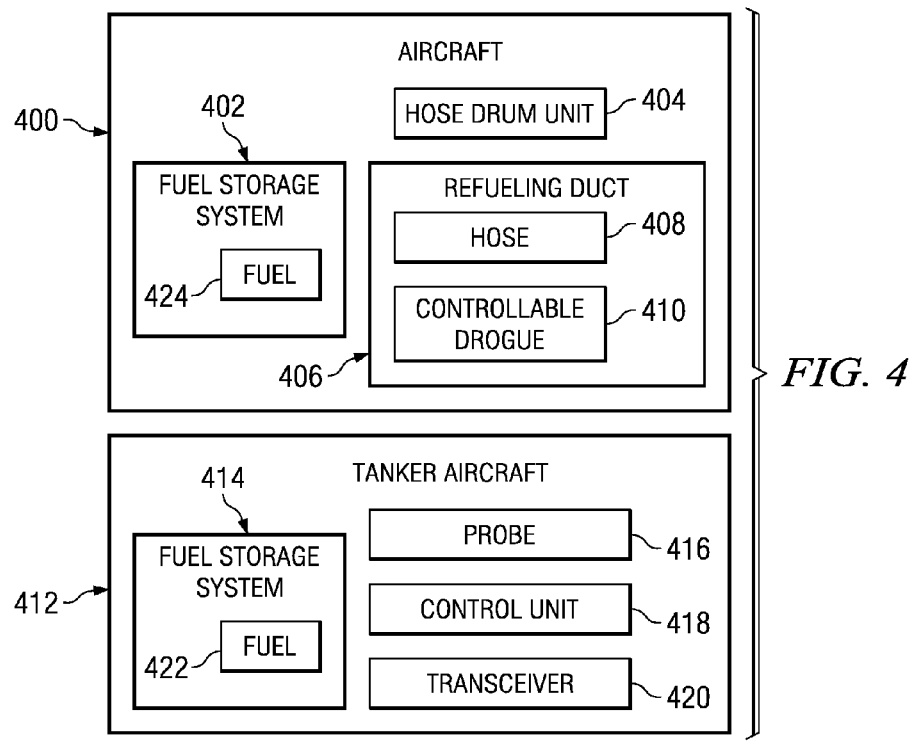
FIG. 4 is a block diagram illustrating components used for refueling an aircraft in accordance with an advantageous embodiment.

Turning now to FIG. 4, a block diagram illustrating components used for refueling an aircraft is depicted in accordance with an advantageous embodiment. In this example, aircraft 400 is an example of aircraft 100 in FIG. 1. Aircraft 400 includes fuel storage system 402, hose drum unit 404, and refueling duct 406.

Fuel storage system 402 contains a set of compartments that may be used to hold fuel 424 used by aircraft 400. A fuel storage system is any apparatus that may be used to store or hold fuel. Fuel storage system 402 may be, for example, one or more fuel tanks having a set of compartments and/or cavities or voids within aircraft 400 designed to receive and hold fuel. In these examples, fuel storage system 402 may be filled during flight through the use of refueling duct 406.

In these examples, refueling duct 406 is comprised of hose 408 and controllable drogue 410. In other embodiments, refueling duct 406 may take other forms. For example, refueling duct 406 may be a boom that is controllable or non-controllable by aircraft 400. In other advantageous embodiments, refueling duct 406 may comprise a boom with controllable drogue 410 being attached to one end of the boom. Further, in other advantageous embodiments, controllable drogue 410 may be a non-controllable drogue.

Hose drum unit 404 is a unit that may deploy and retrieve refueling duct 406. Further, hose drum unit 404 also may provide a storage compartment for refueling duct 406. Hose drum unit 404 may deploy hose 408 with controllable drogue 410 for refueling. Refueling duct 406 may be deployed in aft location with respect to aircraft 400. This aft location may, for example, be at the tail of aircraft 400, or at the trailing edge of a wing, such as wing 204 in FIG. 2, of aircraft 400. After refueling has completed, hose drum unit 404 may then reel in hose 408 and controllable drogue 410 after the refueling process has completed.

Controllable drogue 410 may reduce the challenges associated with refueling aircraft during flight. Controllable drogue 410 is capable of being controlled to change its position with respect to aircraft 400. The change of the position of controllable drogue 410 may be effected by changing surfaces on controllable drogue 410. The change in the surface may change the aerodynamics of controllable drogue 410, resulting in a change of position of controllable drogue 410 with respect to aircraft 400. Controllable drogue 410 may be implemented using any known controllable drogue systems.

Tanker aircraft 412 is an example of tanker aircraft 102 in FIG. 1. In this example, tanker aircraft 412 includes storage system tank 414, probe 416, control unit 418, and transceiver 420. Control unit 418 may be operated by an operator in tanker aircraft 412 to control controllable drogue 410.

The signals for controlling controllable drogue 410 may be transmitted to controllable drogue 410 through transceiver 420. Further, transceiver 420 also may receive signals from controllable drogue 410 that verify the execution of commands or verify other parameters, such as whether a connection has been made between probe 416 and controllable drogue 410.

Further, control unit 418 also may be employed to maneuver probe 416 to further facilitate a connection to probe 416 and controllable drogue 410.

With aircraft 400 and tanker aircraft 412, refueling may occur with tanker aircraft 412 located behind aircraft 400. In these examples, tanker aircraft 412 may have various positions with respect to aircraft 400. For example, tanker aircraft 412 may be behind and above aircraft 400. In other examples, tanker aircraft 412 may be below and behind aircraft 400. In yet other examples, tanker aircraft 412 may be behind and positioned substantially off an axis of aircraft 400. In other words, tanker aircraft 412 may be located to the left or right of an axis extending through aircraft 400.

In these examples, control unit 418 also may initiate the deployment of refueling duct 406 from aircraft 400. With this type of embodiment, no need is present for the pilot of aircraft 400 to position or fly aircraft 400 to connect probe 416 with refueling duct 406. In these examples, a probe may be any structure attached to tanker aircraft 412 that is capable of making a connection to refueling duct 406 in a manner that allows for the transfer of fuel. Instead, the pilot of tanker aircraft 412 flies tanker aircraft 412 in a manner to position tanker aircraft 412 for refueling. In these advantageous embodiments, refueling occurs by transferring fuel 422 from fuel storage system 414 through probe 416 and refueling duct 406 into fuel storage system 402.

Of course, in some advantageous embodiments, a reverse transfer may occur where fuel 424 is transferred from fuel storage system 402 to fuel storage system 414 through refueling duct 406 and probe 416. This type of reverse transfer may occur if aircraft 400 has too much fuel within fuel storage system 402.

The different components illustrated within aircraft 400 and tanker aircraft 412 are described with respect to particular features that may be found in some or all of the different advantageous embodiments. The illustrations of these particular components, however, are not meant to limit the manner in which aircraft 400 and tanker aircraft 412 may be designed or implemented. Other additional components are present that are not shown.

Only components relating to one or more advantageous embodiments are shown for purposes of illustrating features that may be found in these advantageous embodiments. For example, the components connecting refueling duct 406 to fuel storage system 402 are not shown. These components may include, for example, hoses, pipes, pumps, valves, line replaceable units, and other components that are employed in transferring fuel from refueling duct 406 to fuel storage system 402.

Figure 5:
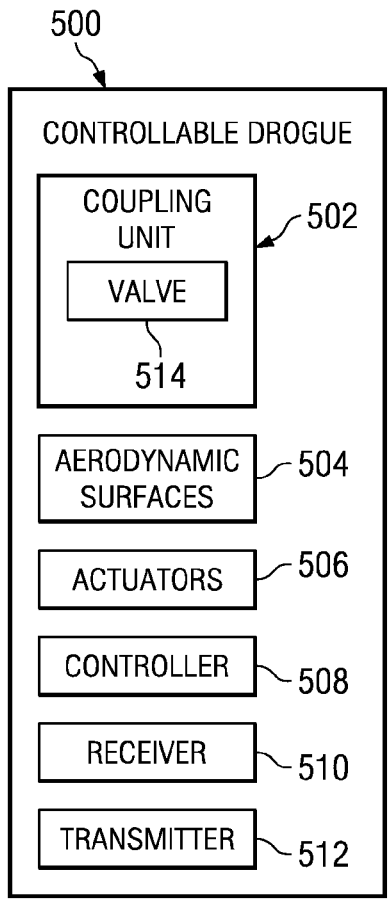
FIG. 5 is a block diagram of a controllable drogue in accordance with an advantageous embodiment.

Turning now to FIG. 5, a block diagram of a controllable drogue is depicted in accordance with an advantageous embodiment. In this example, controllable drogue 500 is a more detailed example of controllable drogue 410 in FIG. 4. Controllable drogue 500 includes coupling unit 502, aerodynamic surfaces 504, actuators 506, controller 508, receiver 510, and transmitter 512.

In these examples, coupling unit 502 attaches controllable drogue 500 to a hose, such as hose 408 in FIG. 4. Further, coupling unit 502 also is capable of providing a connection to a probe, such as probe 416 in FIG. 4. In this depicted example, coupling unit 502 includes valve 514, which may used to control the flow of fuel to and from the aircraft.

Aerodynamic surfaces 504 are a set of aerodynamic surfaces. In these examples, the use of the term a set refers to one or more items. A set of aerodynamic surfaces is one of more aerodynamic surfaces. In these examples, aerodynamic surfaces 504 are moveable aerodynamic surfaces that may be moved to change the aerodynamics of controllable drogue 500. These surfaces may include, for example, without limitation, wings, flaps, ailerons, movable fins, conic shapes, and/or other suitable surfaces.

The movement of aerodynamic surfaces 504 may cause controllable drogue 500 to change its position with respect to the aircraft from which controllable drogue 500 is deployed. Actuators 506 may be used to control the movement and/or position of aerodynamic surfaces 504. Actuators 506 are controlled by controller 508 in these examples.

Controller 508 may take various forms. For example, controller 508 may be a computer, an application specific integrated circuit, a program of logic array, or some other suitable device. Controller 508 generates signals in response to control signals received by receiver 510 in these examples. These control signals may be received from an operator of the tanker aircraft to change the position of controllable drogue 500 for establishing a connection to transfer fuel.

Further, in some cases, controllable drogue 500 also may include transmitter 512. Transmitter 512 may be used to send confirmations of commands made to controllable drogue 500 or provide other feedback. For example, transmitter 512 may send information to the tanker aircraft indicating that a correct connection has been made between the boom and coupling unit 502 in controllable drogue 500.

Controllable drogue 500 may be capable of transmitting a homing signal that allows the tanker to automatically guide the controllable drogue to the probe for connection to create a connection with the tanker aircraft to transfer fuel between the tanker aircraft and the aircraft.

Figure 6:
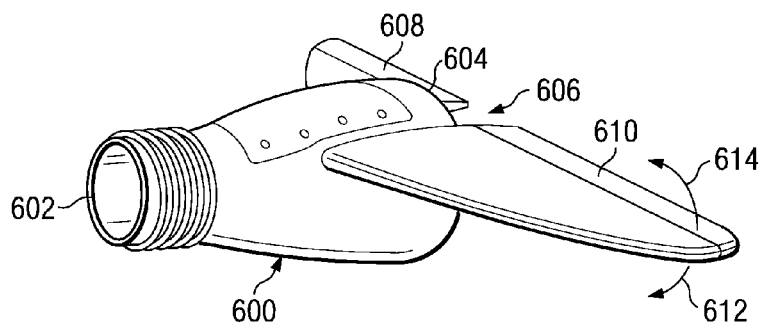
FIG. 6 is a diagram of a controllable drogue in accordance with an advantageous embodiment.

With reference now to FIG. 6, a diagram of a controllable drogue is depicted in accordance with an advantageous embodiment. In this example, controllable drogue 600 is an example of controllable drogue 410 in FIG. 4. Coupler 602 may provide a connection to a hose, such as hose 408 in FIG. 4. Nozzle 604 provides opening 606 to allow the insertion of a probe. In this example, wings 608 and 610 are examples of controllable air surfaces that may be moved to change the position of controllable drogue 600 while in flight. For example, wings 608 and 610 may be rotated along the direction of arrow 612 to generate lift to move controllable drogue 600 upward with respect to an aircraft. Wings 608 and 610 may be moved on the direction of arrow 614 to move controllable drogue 600 in a downward direction to provide for loading from a flight above. Wings 608 and 610 may be moved independently of each other to cause controllable drogue 600 to roll in different directions.

Further, the loading of fuel from above may occur with wings 608 and 610 in the current position. Wings 608 and 610 may be controlled using a control unit, such as controller 508 in FIG. 5. The movement of wings 608 and 610 may be moved using actuators, such as actuators 506 under the control of a controller.

Figure 7:
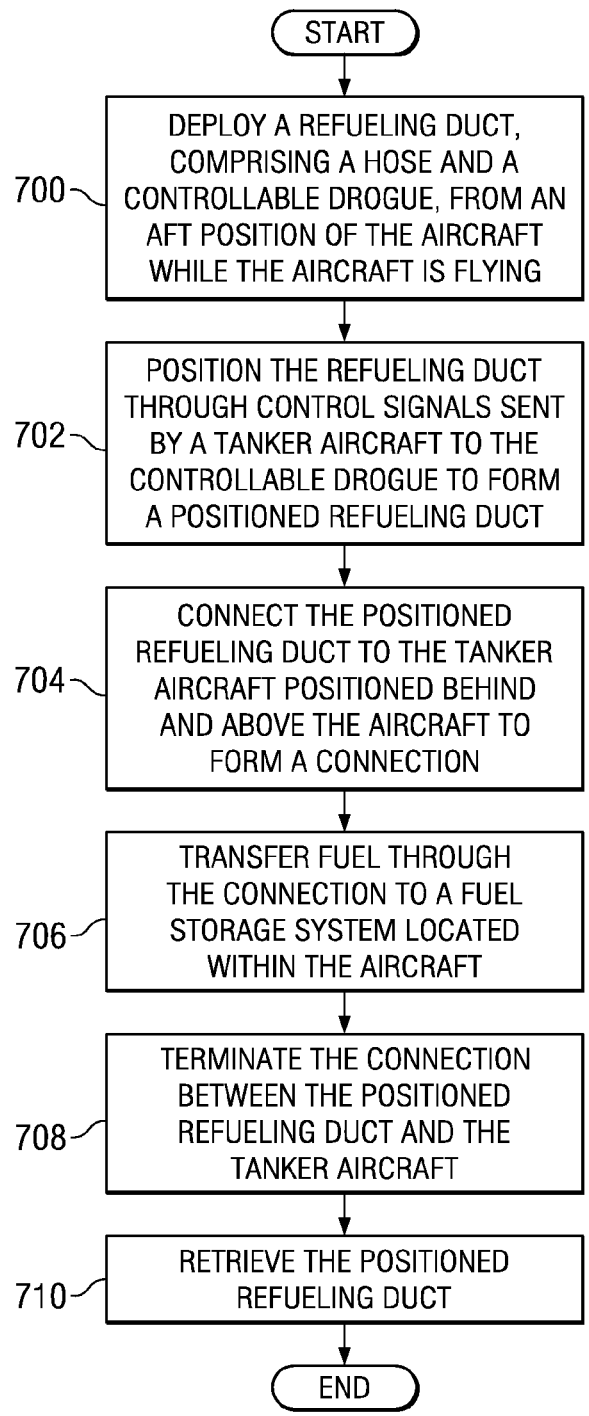
FIG. 7 is a flowchart of a process for refueling an aircraft in accordance with an advantageous embodiment.

With reference now to FIG. 7, a flowchart of a process for refueling an aircraft is depicted in accordance with an advantageous embodiment. The process illustrated in FIG. 7 may be implemented using an aircraft, such as aircraft 400 in FIG. 4. Further, this process also involves a tanker aircraft, such as tanker aircraft 412 in FIG. 4.

The process begins by deploying a refueling duct, comprising a hose and a controllable drogue, from an aft position of the aircraft while the aircraft is flying (operation 700). This deployment may be initiated by operators in the aircraft. In other embodiments, the deployment of the refueling duct may be initiated through signals sent by the operators of the tanker aircraft. Further, in other advantageous embodiments, the refueling duct may take other forms in addition to or instead of a hose on a controllable drogue. For example, the controllable drogue may be mounted on a beam in some embodiments.

The refueling duct is positioned through control signals sent by the tanker aircraft to the controllable drogue to form a positioned refueling duct (operation 702). In these examples, these control signals are radio frequency signals sent by a transmitter in the tanker aircraft to a receiver in the controllable drogue. The operator of the tanker aircraft may send signals to the controllable drogue to change the position of the controllable drogue with respect to the aircraft. Further, this change in positioning may make it easier for the tanker aircraft to make a connection to the controllable drogue and/or reduce the connection time need for coupling with the drogue. This movement or positioning of the controllable drogue may be at a location around the aircraft that reduces turbulence. This turbulence may be, for example, a trailing vortex, downwash, or up wash caused by the aircraft in the leading position that is to receive the fuel.

Thereafter, the positioned refueling duct is connected to the tanker aircraft positioned behind and above the aircraft to form a connection (operation 704). In these examples, the connection with the positioned refueling duct is made through a probe mounted on the tanker aircraft. This probe may make a connection with the refueling duct that allows for the transfer of fuel between the tanker aircraft and the aircraft. In this example, the tanker aircraft is positioned behind and above the aircraft. In other illustrative examples, the tanker aircraft may have other positions, such as behind and below the aircraft.

Next, the process transfers fuel through the connection to a fuel storage system located within the aircraft (operation 706). In other embodiments, fuel may be transferred in the other direction from the fuel storage system in the aircraft back to the tanker aircraft.

After the transfer of fuel has completed, the connection between the refueling duct and the tanker aircraft is terminated (operation 708). Thereafter, the positioned refueling duct is retrieved (operation 710), with the process terminating thereafter.

Figure 8:
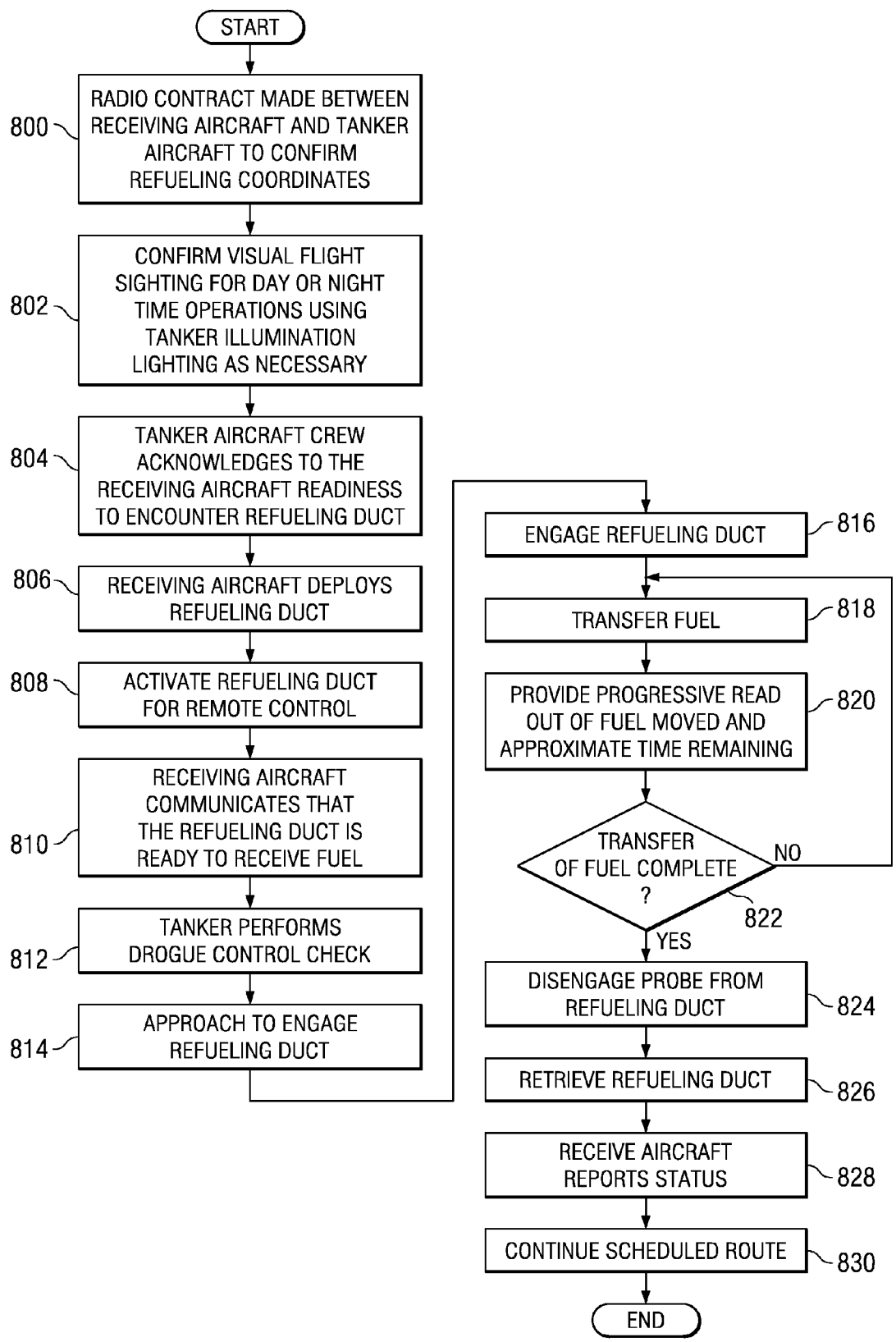
FIG. 8 is a flowchart of a process for refueling operations in accordance with an advantageous embodiment.

With reference now to FIG. 8, a flowchart of a process for refueling operations is depicted in accordance with an advantageous embodiment. The process illustrated in FIG. 8 is a more detailed description of an air refueling process. This same process may be performed for defueling or moving excess fuel from an aircraft to a tanker aircraft.

The process illustrated in FIG. 8 assumes that a refueling process has been scheduled for the aircraft. This scheduling may include an identification of coordinates as well as a time for the refueling operation.

The process begins with the receiving aircraft and the tanker aircraft making radio contact to confirm refueling coordinates (operation 800). Thereafter, the process confirms a visual sighting for day or by tanker forward luminary lighting for night time operations (operation 802). Once a visual sighting is made in operation 802, the tanker aircraft crew acknowledges to the receiving aircraft the readiness to encounter the refueling duct (operation 804).

Thereafter, the receiving aircraft deploys the refueling duct (operation 806). In other advantageous embodiments, the refueling duct may be deployed based on reading frequency signals sent to the aircraft from the tanker aircraft. The receiving aircraft then activates the refueling duct for remote control (operation 808). The receiving aircraft communicates that the refueling duct is ready to receive fuel (operation 810).

Next, the tanker aircraft crew performs a control check of the drogue (operation 812). This operation may include various commands to maneuver the refueling duct into a position for engagement with the tanker aircraft. In these examples, the control check may maneuver the refueling duct upwards. Further, the refueling duct may be moved to the left or right, depending on the particular implementation.

The tanker aircraft in the next operation approaches the refueling duct for engagement (operation 814). The approach in operation 814 also may include repositioning the refueling duct to facilitate a capture and engagement between the refueling duct for the receiver aircraft and the probe for the tanker aircraft.

Thereafter, the tanker aircraft engages the refueling duct (operation 816). The engagement in operation 816 may involve contact between the probe and the refueling duct in a manner that causes a seal to occur through which fuel may be transferred between the receiving aircraft and the tanker aircraft. After the refueling duct has been engaged, fuel is transferred from the tanker aircraft to the receiving aircraft (operation 818).

A progressive read out of fuel moved and approximate time remaining for the refueling is provided (operation 820). This information may be provided to both the receiving aircraft and the tanker aircraft. A determination is then made as to whether the transfer of fuel is complete (operation 822). If the transfer of fuel is not complete, the process returns to operation 818.

Otherwise, the tanker aircraft disengages the probe from the refueling duct (operation 824). After the tanker aircraft has disengaged from the refueling duct, the receiving aircraft retrieves the refueling duct (operation 826). The receiving aircraft then may report the flight status (operation 828). This status may include an estimated time and any schedule impacts that occurred during the refueling. The receiving aircraft then continues on the scheduled route (operation 830), with the process terminating thereafter.

Thus, the different advantageous embodiments provide a method and apparatus for re-fueling or de-fueling an aircraft. In one or more of the different advantageous embodiments, a refueling duct is deployed from an aircraft while the aircraft is flying. The refueling duct may include a hose and controllable drogue. The refueling duct is positioned through control signals sent by the tanker aircraft to the controllable drogue to form a position refueling duct. A connection is made to the position refueling duct by the tanker aircraft positioned behind the aircraft. Fuel may then be transferred through the connection to or from a fuel storage system located within the aircraft.

The different advantageous embodiments allow operators in the tanker aircraft to have features to control the drogue in the positioning of the refueling duct. This control of the drogue makes it easier for the connection to occur. Further, the positioning of the controllable drogue may be performed to allow the tanker aircraft to make the connection in an area around the aircraft in which the airflow is smoother. Updrafts, downdrafts, and vortexes may be avoided by positioning the controllable drogue.

Further, by allowing the tanker aircraft to position itself with respect to the aircraft and to position the controllable drogue, the pilot of the aircraft receiving the fuel does not need to perform any actions to make the connection. As a result, the training and practice needed by pilots to make this connection is avoided for pilots of the aircraft receiving fuel. In this manner, refueling of commercial aircraft may be made more feasible.

In this manner, refueling of aircraft is made easier because the training needed to perform a refueling operation is reduced for the aircraft receiving fuel. The crew of the aircraft receiving fuel may only need training to know how to deploy and retrieve a refueling duct. In some cases, this process may be automated and controlled by the tanker aircraft. The crew of the aircraft receiving fuel need only establish a normal steady condition of flight and does not need to have extra ordinary training or skill in engaging a refueling apparatus and holding an appropriate position for a refueling operation. This type of training and experience is found with the crew of the tanker aircraft. With less tanker aircraft than aircraft receiving fuel, the amount of training and experience needed is reduced. In this manner, the fueling operations may be made more common for commercial uses in addition to simplifying current refueling operations.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for refueling an aircraft, the method comprising:
    deploying a refueling duct from an aft position of the aircraft while the aircraft is flying, wherein the refueling duct comprises a hose and a controllable drogue;
    positioning the refueling duct through control signals sent by a tanker aircraft to the controllable drogue to form a positioned refueling duct;
    connecting the positioned refueling duct to the tanker aircraft positioned behind and above the aircraft to form a connection; and
    transferring fuel through the connection to a fuel storage system located within the aircraft.

2. The method of claim 1, wherein the tanker aircraft is positioned substantially off an axis of the aircraft.

3. The method of claim 2, wherein the refueling duct is deployed from a wing of the aircraft.

4. The method of claim 1 further comprising:
    transferring the fuel through the connection back to the tanker aircraft.

5. A method for refueling an aircraft, the method comprising:
    positioning a tanker aircraft behind and above the aircraft while the aircraft is in flight, wherein the aircraft has a refueling duct deployed from an aft position;
    connecting the refueling duct to the tanker aircraft positioned behind the aircraft to form a connection; and
    transferring fuel through the connection.

6. The method of claim 5 further comprising:
    deploying the refueling duct from the aft position of the aircraft while the aircraft is flying.

7. The method of claim 6, wherein the refueling duct is deployed by the aircraft.

8. The method of claim 6, wherein the refueling duct is deployed in response to control signals sent by the tanker aircraft.

9. The method of claim 5, wherein the positioning step comprises:
    sending control signals from the tanker aircraft to the refueling duct, wherein the refueling duct positions itself in response to the control signals.

10. The method of claim 9, wherein the refueling duct comprises a hose and a controllable drogue.

11. The method of claim 5, wherein the transferring step comprises:
    transferring the fuel from the tanker aircraft to the aircraft through the connection.

12. The method of claim 5, wherein the transferring step comprises:
    transferring the fuel from the aircraft to the tanker aircraft through the connection.

13. The method of claim 5, wherein the tanker aircraft is positioned above the aircraft.

14. The method of claim 5, wherein the tanker aircraft is positioned below the aircraft.

15. The method of claim 5, wherein the tanker aircraft is positioned substantially off an axis of the aircraft.

* * * * *